Sept. 12, 1944. J. J. PALOTSEE 2,358,247
MACHINE FOR DRIVING HONES
Filed Feb. 28, 1944 7 Sheets-Sheet 1
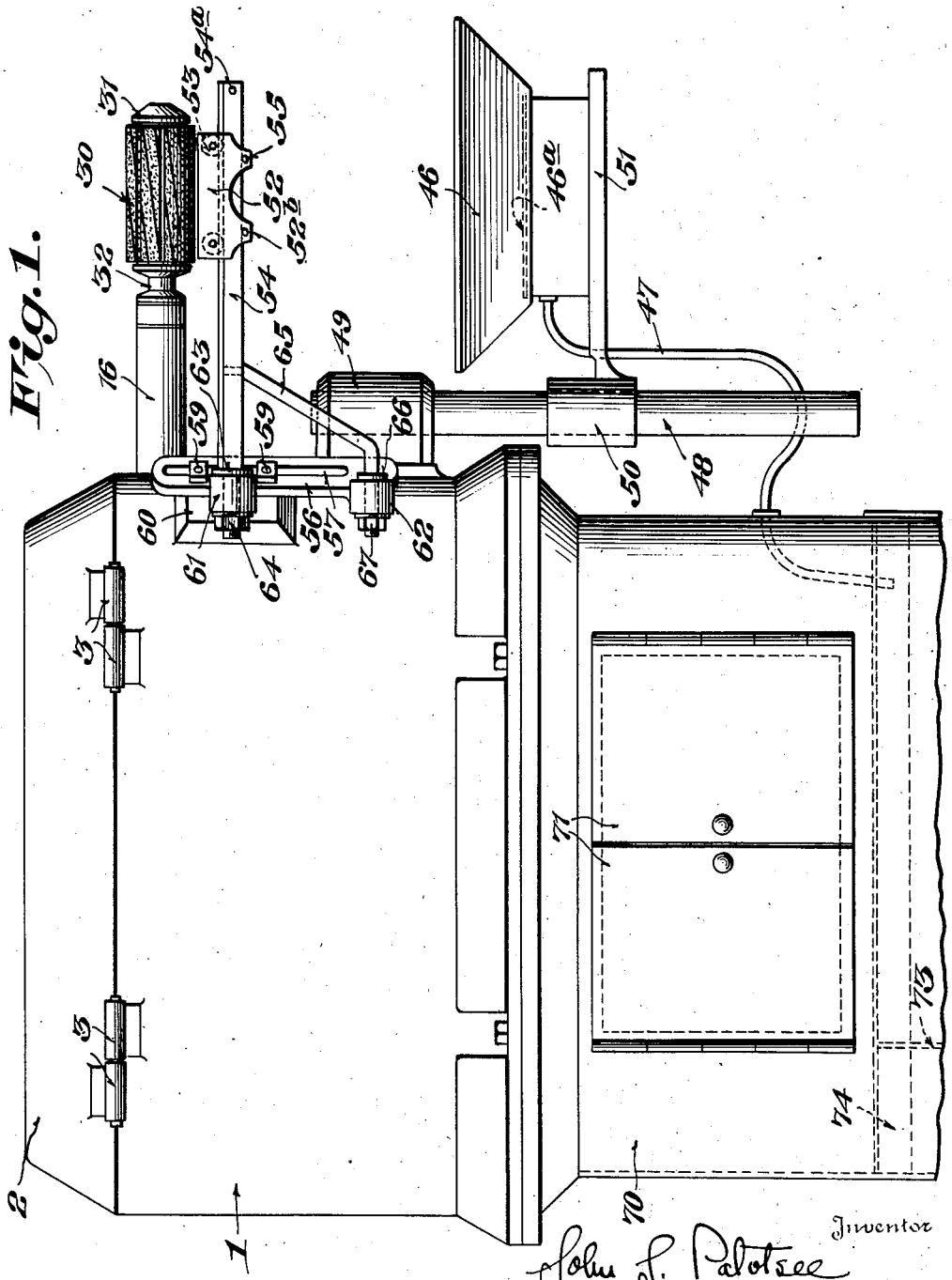

Sept. 12, 1944.  J. J. PALOTSEE  2,358,247
MACHINE FOR DRIVING HONES
Filed Feb. 28, 1944   7 Sheets-Sheet 2
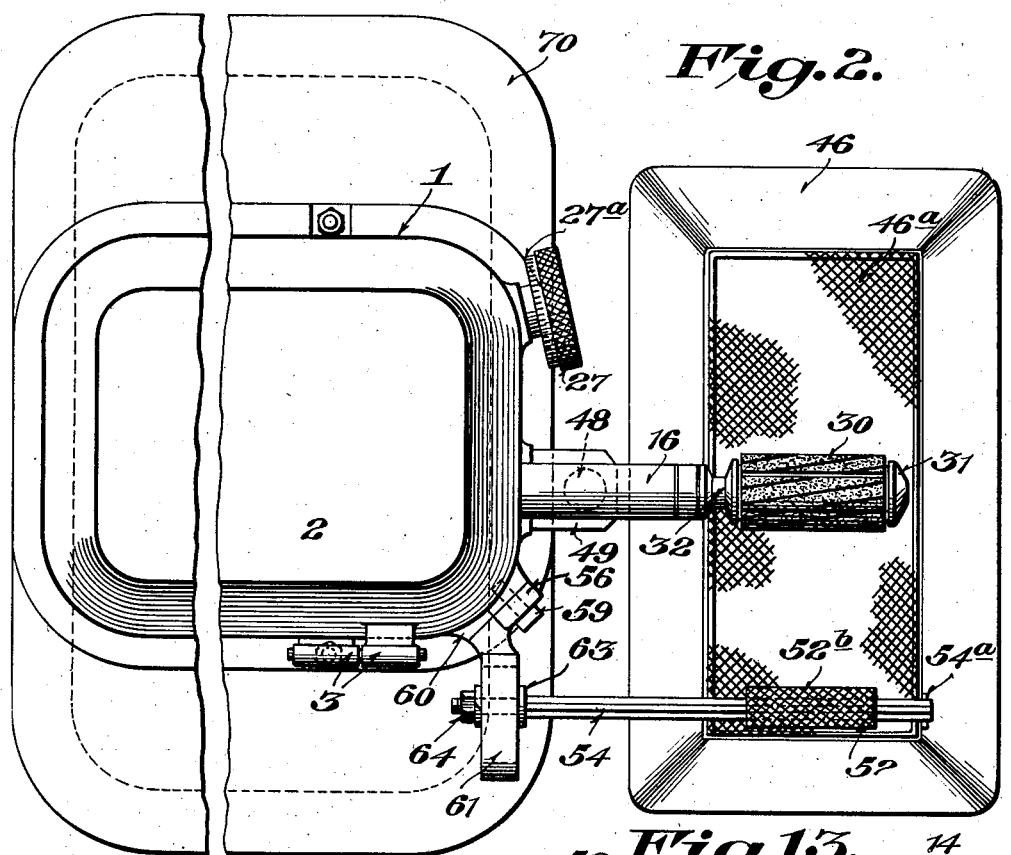
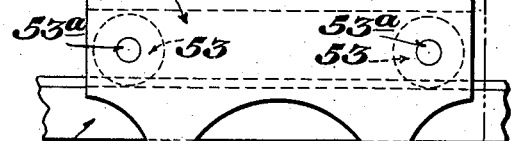
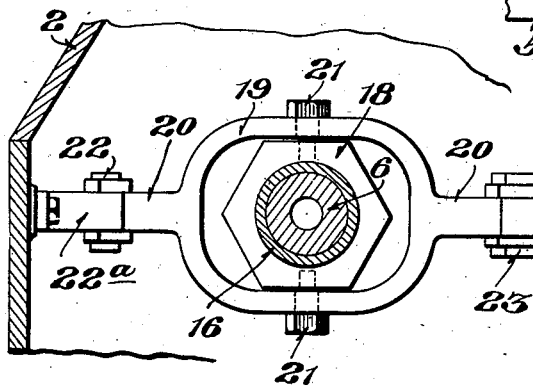
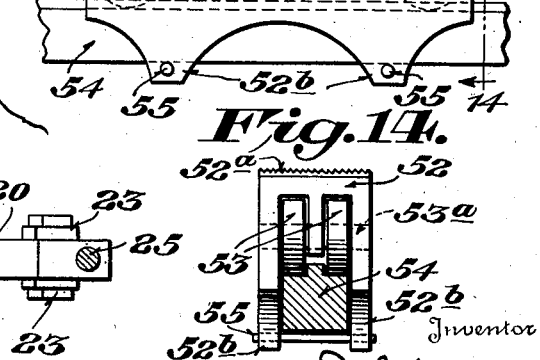
Inventor
John J. Palotsee
By Alexander Dowell
Attorneys Sept. 12, 1944. J. J. PALOTSEE 2,358,247
MACHINE FOR DRIVING HONES
Filed Feb. 28, 1944 7 Sheets-Sheet 3

Sept. 12, 1944.    J. J. PALOTSEE    2,358,247
MACHINE FOR DRIVING HONES
Filed Feb. 28, 1944    7 Sheets-Sheet 5

Inventor
John J. Palotsee
Alexander Dowell
Attorneys

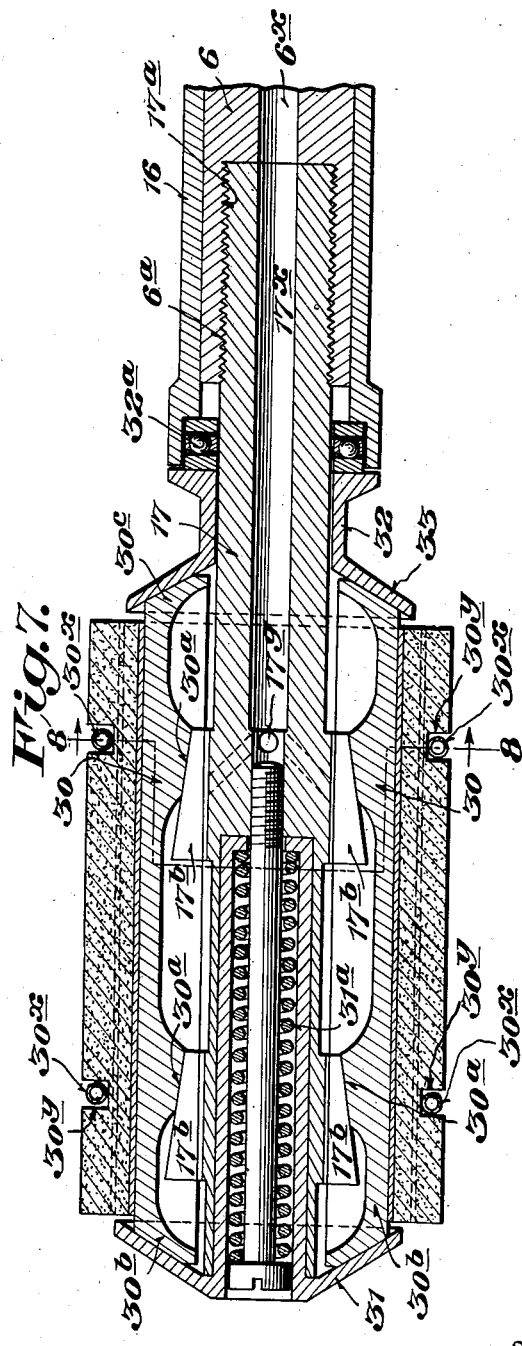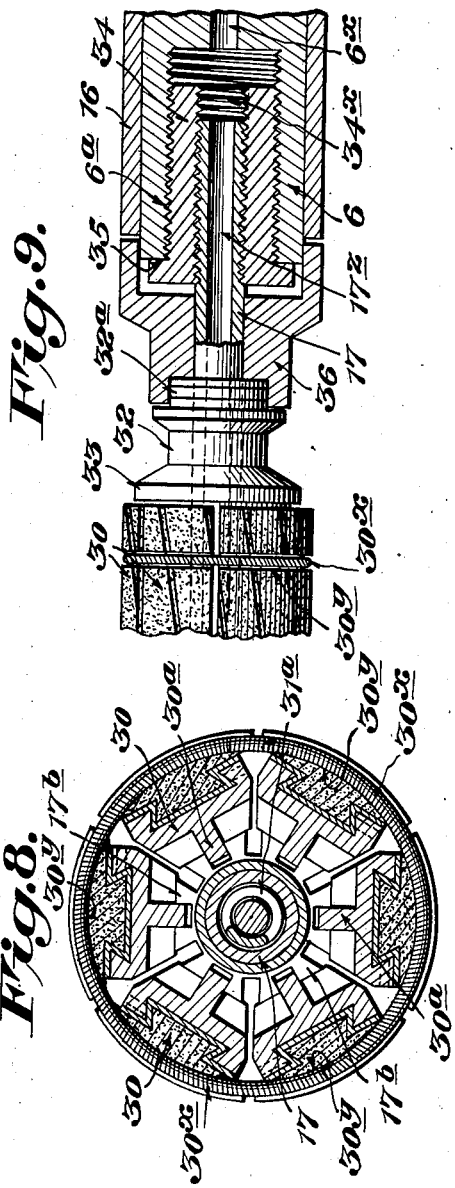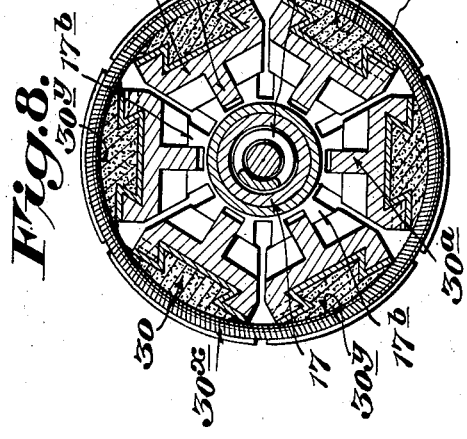

Sept. 12, 1944.  J. J. PALOTSEE  2,358,247
MACHINE FOR DRIVING HONES
Filed Feb. 28, 1944  7 Sheets-Sheet 7
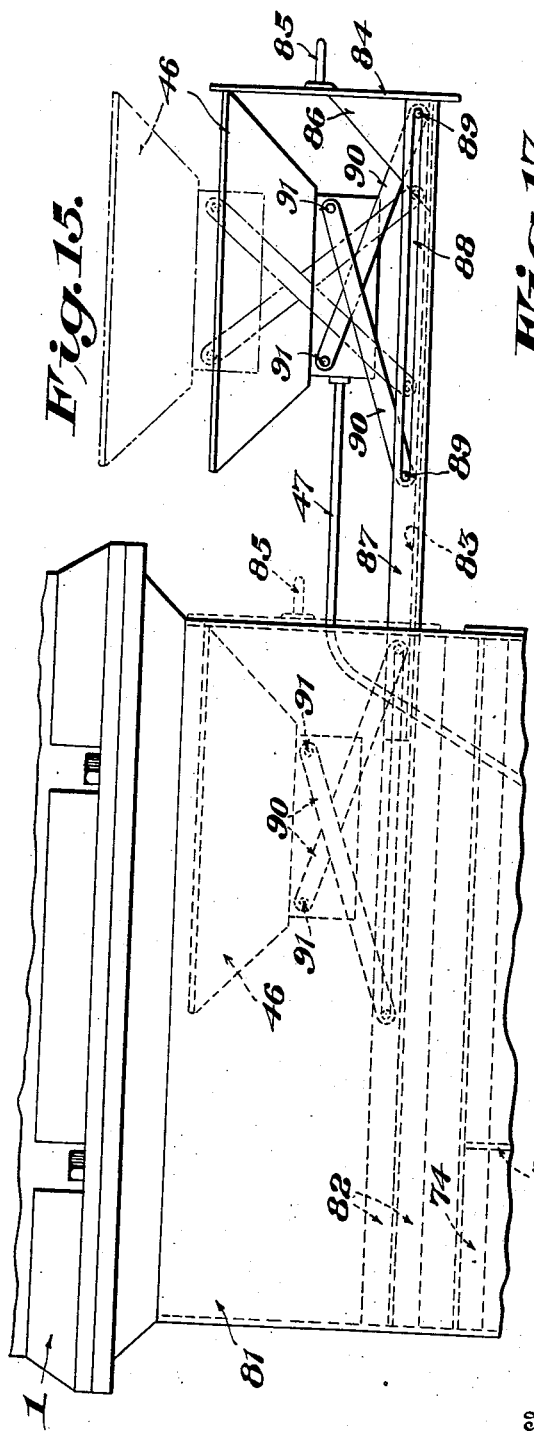
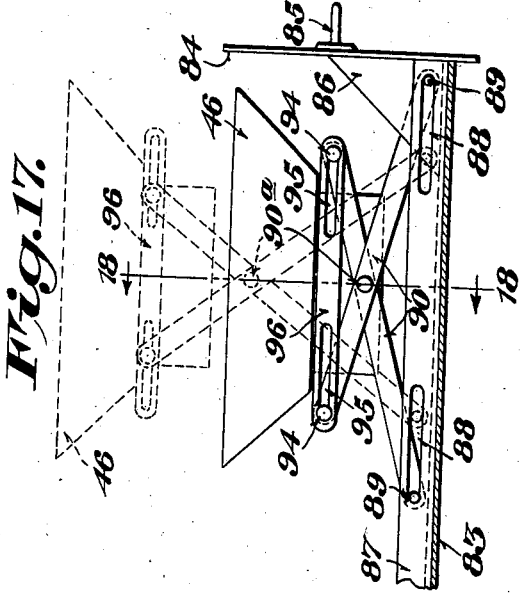
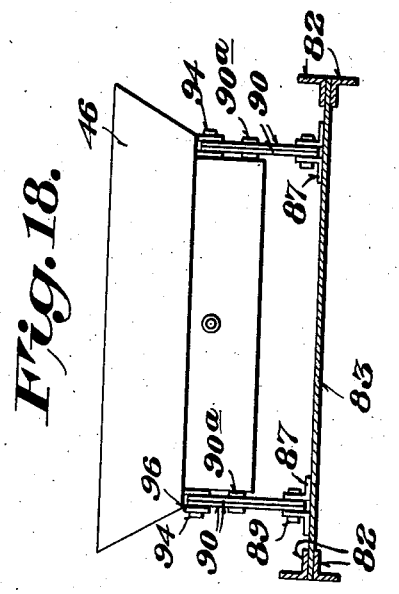
Inventor
John P. Palotsee
By Alexander & Dowell
Attorneys Patented Sept. 12, 1944

2,358,247

UNITED STATES PATENT OFFICE 2,358,247

MACHINE FOR DRIVING HONES

John J. Palotsee, Youngstown, Ohio

Application February 28, 1944, Serial No. 524,271

18 Claims. (Cl. 51—72)

This invention is a novel machine for driving expansible and contractible hones, used for boring and grinding bores, said machine including means for rotating the hone spindle and having means for varying the speed of rotation thereof, and including means for adjusting the external diameter of the hone while the latter is being rotated, said machine also having means for directing cutting fluid through the drive shaft of the machine and the hone spindle, the fluid being discharged within the hone together with means for collecting the drippings from the ground bore and directing same again into the fluid circuit.

Other objects of the invention are to provide a novel cabinet or base upon which the machine stands whereby the drip pan which collects the fluid from the bore to be ground may be housed within the cabinet when not in use to protect same from dust and dirt, the same being projectible from the cabinet and adjustable into different heights below the work when in use during the polishing or grinding operation.

A still further object is to provide a novel trolley mounted upon an adjustable track adapted to support the work being ground by the hone.

Other objects of the invention will be hereinafter set forth.

I will explain the invention with reference to the accompanying drawings, which illustrate several practical embodiments thereof, to enable others familiar with the art to adopt and use the same; and will summarize in the claims, the novel features of construction, and novel combinations of parts, for which protection is desired.

In said drawings:

Fig. 1 is a side elevation of the machine and the upper portion of the cabinet, and showing the spindle, trolley, and pan in normal position of use.

Fig. 2 is a top plan view, partly broken away, of the machine shown in Fig. 1.

Fig. 6 is an enlarged vertical section on the line 6—6, Fig. 4.

Fig. 7 is an enlarged section through the hone, showing the adjacent portions of the machine drive shaft.

Fig. 8 is a section on the line 8—8, Fig. 7.

Fig. 9 is a detail section showing a modification utilizing an adapter collar adjusting the drive shaft for smaller sized homes.

Fig. 13 is an enlarged elevation showing the trolley mounted upon the track.

Fig. 14 is a vertical section on the line 14—14, Fig. 13.

Fig. 15 is an elevation showing in dotted lines one modification of the oil-collecting pan housed within the cabinet, and showing in full lines the pan in normal lowered position, and in dot and dash lines the pan in elevated position.

Fig. 16 is a front elevation of the cabinet looking at the sliding drawer, and showing the pan in Fig. 15 housed within the cabinet.

Fig. 17 is an elevation showing a modified arrangement of arms for adjusting the height of the pan.

Fig. 18 is a section on the line 18—18, Fig. 17.

Figure 3:
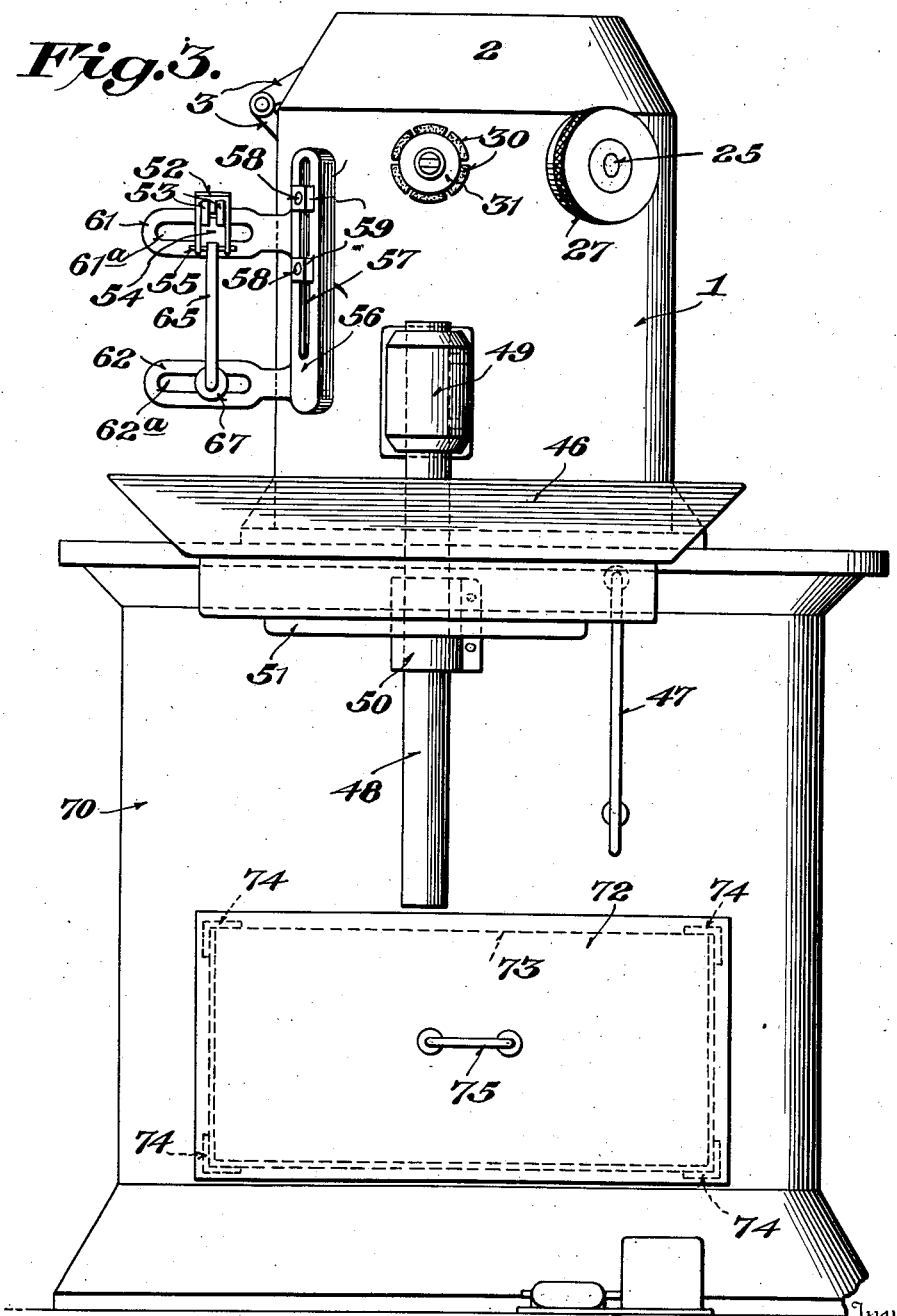
Fig. 3 is a front elevation of the machine shown in Fig. 1 and showing the complete cabinet.

As shown, the machine comprises a casing 1 of substantial rectangular shape having rounded corners, and having an open top provided with a cover 2 hingedly mounted as at 3 to one side of casing 1; said casing 1 being adapted to be supported upon a cabinet, hereinafter described.

Within the casing 1 adjacent the opposite ends thereof are horizontal beams 4 carrying bearings 5 (Figs. 4 and 5), for a hollow drive shaft 6, said bearings 5 being preferably of ball or roller type. On shaft 6 is keyed a clutch collar 7, Fig. 4, cooperating with a clutch disk 8 secured by screws or the like to the adjacent face of a stepped pulley cone 9 having three steps 9a, 9b, and 9c loosely mounted on shaft 6; the stepped cone 9 forming a means for driving shaft 6 at different speeds. At the opposite end of the step cone 9 from the clutch disk 8 is a thrust bearing 10 (Fig. 4) engaged by one end of a coiled spring 11 surrounding shaft 6, the opposite end of spring 11 being engaged by an abutment 12, spring 11 normally urging the assembly 8 and 9 towards clutch collar 7, the abutment 12 comprising an adjusting nut and lock nut for regulating the tension of spring 11 and hence the pressure of clutch disk 8 against clutch collar 7. This arrangement allows cone 9 and disk 8 to slip on shaft 6 in case the hone locks in the bore being ground.

Within casing 1, below shaft 8, is a motor 13 (Fig. 5) supported on a base 14a hingedly mounted as at 15a at one side of the casing 1, whereby base 14a will normally tilt by gravity. Motor 13 carries a pulley 14, and the belt 15 runs around pulley 14 and any one of the stepped pulleys 9a, 9b or 9c of cone 9 on shaft 6, the weight of motor 13 maintaining the tension of bolt 15 substantially constant for all engagements of belt 15 with the stepped cone 9.

One end of shaft 6 extends through an end of casing 1 and carries thereon a sliding sleeve 16 (Figs. 4, 7 and 9), the outer end of the shaft 6 having a tapped bore 6a therein receiving the threaded end 17a (Fig. 7) of the spindle 17 of the expansible hone, as hereinafter described, said spindle 17 being hollow and forming a continuation of the bore of shaft 6. Sleeve 16 is non-rotatably but slidably mounted upon shaft 6, and means are provided for adjusting the position of sleeve 16 on the shaft.

Figure 4:
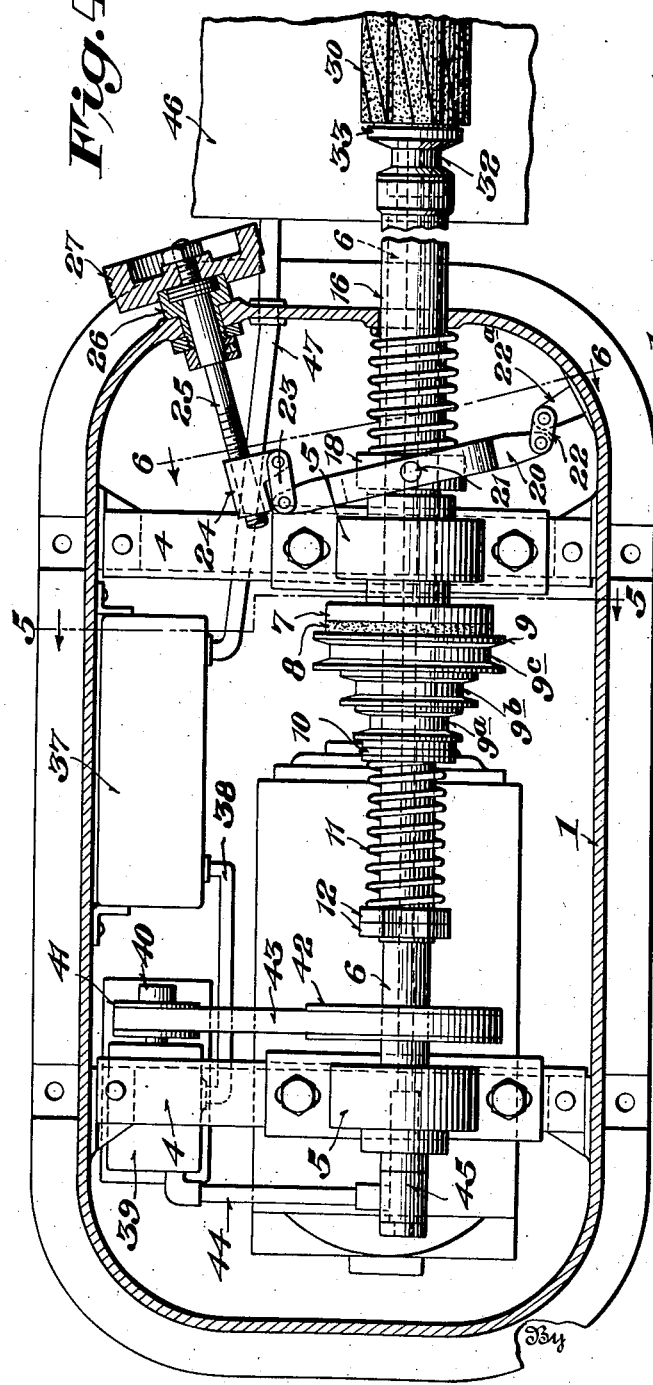
Fig. 4 is a horizontal section through the machine casing on the axis of the hone shaft and hone adjusting knob.
Figure 5:
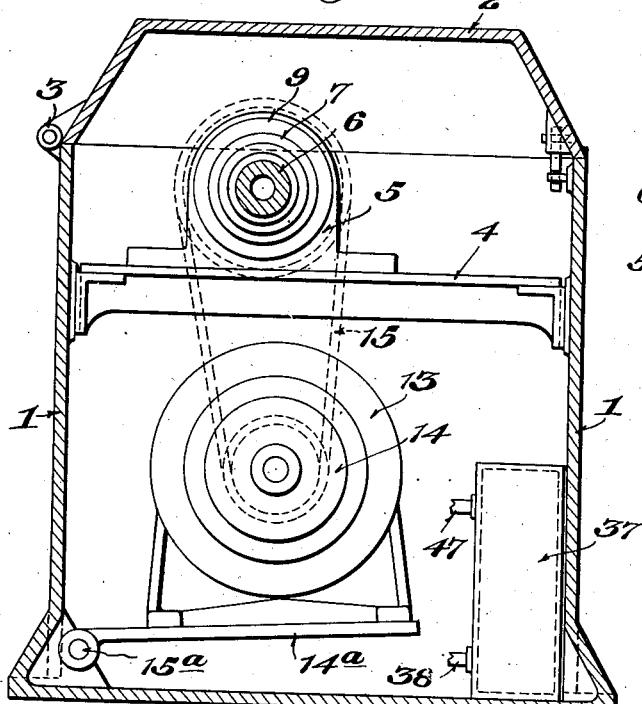
Fig. 5 is a vertical section through the casing, on line 5—5, Fig. 4, showing the drive for the hone shaft.

As shown in Figs. 4 and 6, at the inner end of sleeve 16 is a hexagonal enlargement 18, preferably shrunk or otherwise secured to said sleeve, said enlargement fitting within an opening 19 in a swingable lever 20, with pivot pins 21 passing through lever 20 and arranged diametrically of the axis of sleeve 16, whereby lever 20 may pivot with respect to the enlargement 18 to shift sleeve 16 axially of shaft 6. One end of lever 20 is pivoted by links 22 to a bracket 22a mounted upon the side of casing 1, while the other end of lever 20 is connected by links 23 with a tapped sleeve 24 (Fig. 4). engaged by a threaded shaft 25 journaled in a bushing 26 in the end of casing 1, said shaft 25 carrying on its outer end a hand wheel 27 carrying calibrations 27a (Fig. 2) to visually indicate the external diameter of the hone carried by the shaft 6. Bushing 26 supports shaft 25 for rotation, but prevents axial movement of the shaft.

Thus, as hand wheel 27 is rotated, lever 20 will be pivoted toward or away from the adjacent end of casing 1, the hexagonal enlargement 18 of sleeve 16 shifting sleeve 16 axially of shaft 6. Preferably a coiled spring 28 is provided around sleeve 16 between the hexagonal head 18 and the adjacent end of casing 1 to absorb back lash and to prevent play between the parts, said spring 28 normally maintaining links 22 and 23 substantially parallel with the shaft 6.

The adjustable hone carried by the shaft 6 is preferably, not not necessarily, similar to that shown in my Letters Patent No. 2,332,463, dated October 19, 1943, the same consisting, in general, of spindle 17 having a threaded end 17a adapted to enter the threaded bore 6a in the end of shaft 6 (Fig. 7) so as to be supported thereby. Upon spindle 17 are spaced enlargements 17b, preferably of hexagonal or other polygonal shape and having their faces inclined in the same direction, engaging correspondingly shaped faces 30a of the hone carrying segments 30, whereby as the hone segments 30 are shifted axially of spindle 17 the external diameter of the hone will be enlarged or decreased, in the manner described in my aforementioned patent, the particular type of hone forming no part of my present invention.

The outer ends of the segments 30 are provided with inclined surfaces 30b engaged by a conical head 31 yieldably maintained thereagainst by means of a coiled spring 31a normally tending to urge head 31 toward the opposite end of spindle 17, while permitting the head 31 to yield to permit the enlargement of the diameter of the hone under adjustment. The opposite ends of segments 30 are provided with conical surfaces 30c engaged by a slidable member 32 carrying a similarly shaped conical head 33 contacting the surfaces 30c, as shown in Fig. 7. Endless springs 30x (Figs 7, 8, 9) are provided around the segments 30 adjacent each end of the hone, said springs being housed in recesses 30y as shown and holding the segments in place when the hone is being decreased, i. e., when sleeve 16 is being backed away from the hone.

The opposite end of slidable member 32 is engaged by the outer end of the axially movable sleeve 16, a thrust bearing 32a being preferably interposed therebetween. By this construction, as sleeve 16 is shifted axially of shaft 6, the hone will be adjusted to a larger or smaller diameter, this adjustment may be made while shaft 6 is being rotated by manipulating the hand wheel 27. The bore 17x in spindle 17 forms a continuation of the bore 6x of shaft 6, the inner end of bore 17x of the spindle being provided with ducts 17y (Fig. 7) leading to the exterior of spindle 17 adjacent the centers of the hone segments 30, whereby cutting fluid for assisting the hone segments 30 during the process of grinding or polishing may be supplied, the fluid passing outwardly between the segments 30 and into contact with the cylindrical surface which is being ground.

In the form shown in Fig. 9, a modified member 32 is shown adapted for use for mounting a small hone on the shaft 6. In this modification a threaded member 34 having a head 35 is mounted within bore 6a of shaft 6, said member 34 having a threaded bore 34x receiving the threaded end of the hollow spindle 17z of the smaller sized hone. An adapting collar 36 is slidably mounted on spindle 17 and has one end engaging the end of member 32, a thrust bearing 32a being interposed therebetween. The opposite end of adapting collar 36 receives the end of the shaft 6 and engages the end of sleeve 16, whereby as sleeve 16 is adjusted axially of shaft 6 the sleeve 16 will shift the adapting collar 36, which in turn engages the member 32 carried on the spindle 17 so that the diameter of the related hone will be correspondingly adjusted. In this modification the bore of spindle 17 communicates directly through the bore 34x of member 34 and with the bore 6x of shaft 6, for supplying cutting fluid which is discharged between the hone segments 30 adjacent the centers thereof, as previously described.

The fluid which is supplied to the hone is contained in a reservoir or tank 37 housed within the casing 1 (Figs. 4 and 5) and having an outlet 38 leading to a pump 39 (Fig. 4) having a shaft 40 carrying a pulley 41 opposite a pulley 42 on shaft 6, a belt 43 running around pulleys 41 and 42, as shown. Pump 39 forces the fluid through pipe 44 into a T-fitting 45 (Fig. 4) on the end of shaft 6 within the casing 1, the fitting 45 communicating wtih the bore 6x of shaft 6, whereby the fluid will be forced under pressure through bore 6x and will be discharged as above described within the hone segments adjacent the centers thereof.

The drippings and excess fluid from the work drops into a pan 46 adjustably mounted on the casing 1 or cabinet below the hone, the fluid collected within the pan 46 passing through a flexible conduit or hose 47 the inner end of which communicates with the inlet of tank 37, suitable screens 46a (Fig. 2) being provided in the bottom of pan 46 to catch any particles of metal such as cuttings or the like, to prevent same from being carried over into the tank 37.

As shown in Figs. 1 and 2, in order to adjustably support the drip pan 46, I preferably provide a post 48 having its upper end fixed in lug 49 of casing 1 at the end adjacent the hone, said post being engaged by an adjustable clamp 50 carrying an arm 51 upon which the pan 46 rests.

In order to support the work being operated upon by the hone, I provide a trolley 52 (shown more particularly in Figs. 1, 13 and 14) having a roughened upper surface 52a to prevent the work from sliding thereon, said trolley being preferably of inverted U-shape, carrying pairs of spaced rollers 53 adjacent each end mounted upon shafts 53a, said rollers rolling upon an inverted T-shaped track 54, having a cross pin 54a at its outer end to prevent the trolley from rolling off of the end of the track. The sides of the trolley 52 preferably have portions 52b depending below track 54, and rods 55 connect the depending portions 52b below track 54 to prevent the ends of trolley 52 from being lifted upwardly off of track 54.

Track 54 is horizontally disposed adjacent one side of casing 1, and is adjustable both vertically and laterally of the casing. As shown, the inner end of track 54 is carried by a bracket 56 (Fig. 3) having a vertically disposed slot 57 therein (Figs. 1 and 3) receiving threaded lugs 58 carried by casing 1 provided with nuts 59, whereby the bracket 56 may be adjusted vertically upon casing 1 and locked in adjusted position. The threaded studs 58 preferably extend from a flattened boss 60 on the outer face of casing 1, as shown more particularly in Figs. 1 and 2.

Bracket 56 carries horizontally disposed parallel arms 61 and 62 provided with horizontal slots 61a and 62a respectively. On track 54 adjacent the inner end is a fixed shoulder or enlargement 63 (Fig. 1), and beyond the shoulder the track 54 is threaded and cylindrical and adapted to pass through slot 61a in the upper arm 61, the inner end carrying a nut 64 for securing track 54 in a horizontal adjusted position in the arm 61. A supporting brace 65 is provided adjacent the inner end of track 54, same having its upper end secured thereto in any desired manner and its lower end bent to extend parallel with track 54, the same carrying an enlargement or shoulder 66 (Fig. 1) similar to shoulder 63, and a nut 67 on the threaded inner end of brace 65 locks the brace in slot 62a whereby the brace 65 may be shifted and locked in any adjustable horizontal position along with the track 54. Thus the track 54 may be shifted vertically as well as toward or from the shaft 6 of the hone, to accommodate the size and shape of the work, which work may rest directly upon the roughened upper surface 52a of trolley 52, and may be moved parallel with shaft 6 while supporting the work engaged by the hone.

In Figs. 1, 2 and 3, the casing 1 is shown as seating upon a cabinet 70 having doors 71 (Fig. 1) in one side, its upper portion forming a convenient receptacle for parts of the machine, while in the lower portion of cabinet 70, at one end, is an opening 72 (Fig. 3) through which a storage tank 73 for the cutting fluid may be withdrawn, the storage tank 73 slidably engaging at its upper and lower edges angle bars 74, and the end of tank 73 forming the closure for opening 72, and carrying a handle 75 whereby the storage tank may be shifted with respect to the cabinet 70. If desired, the flexible tubing 47 from drip pan 46 may discharge into the top of the storage tank 73, as indicated in dotted lines in Fig. 1.

Figure 12:
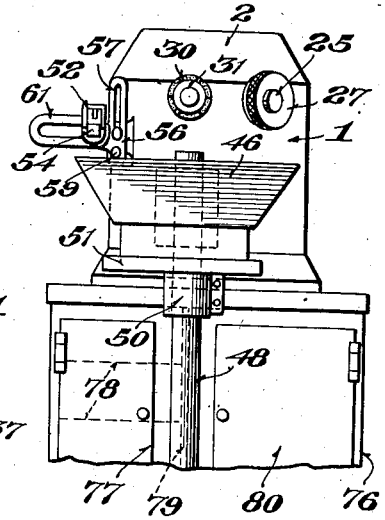
Fig. 12 is a front elevation of the machine shown in Fig. 10 showing a modified cabinet.
Figure 10:
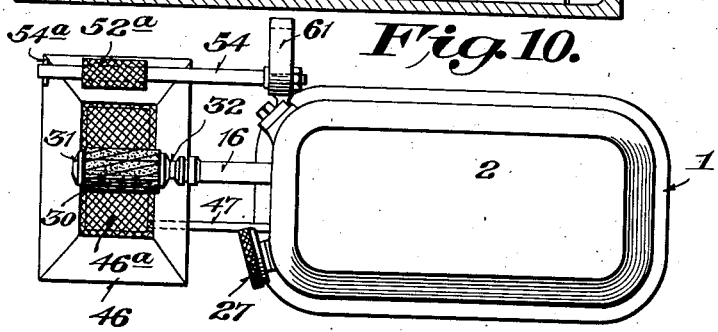
Fig. 10 is a reduced top plan view of the machine shown in Fig. 1.
Figure 11:
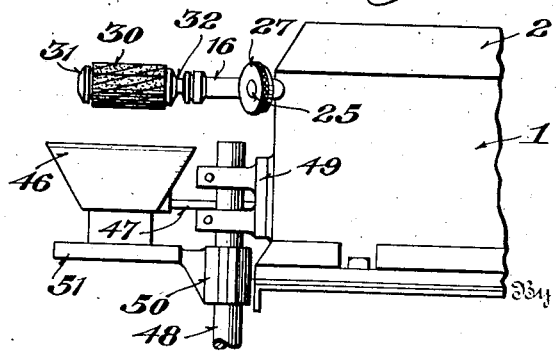
Fig. 11 is a side elevation of the machine shown in Fig. 10, looking at the opposite side from Fig. 1.

In Fig. 12 a modified cabinet 76 is shown, having a door 77 in its front face at one side, giving access to shelves 78 or the like, extending to a central vertical partition 79; and having a door 80 at the other side of the partition into which the reserve or storage tank for the cutting fluid may be housed, or into which space various sizes and types of hones may be stored.

In Figs. 15 to 18 a further modified cabinet structure 81 is shown, supporting base 1, said cabinet 81 having an opening in its end below the shaft 6. Within cabinet 81 at opposite sides thereof are upper and lower angle bars 82 spaced apart to form guides for a sliding plate 83 which may be pulled in and out of cabinet 81 from said opening, and which plate 83 supports the drip pan 46, the plate 83 having a vertical face plate 84 at its front end normally provided with a handle 85, the front plate 84 closing the opening in the cabinet 81 when plate 83 is retracted or housed within the cabinet. Vertical plate 84 is preferably secured to plate 83 by means of corner braces 86, to give rigidity thereto. Upon plate 83 adjacent the opposite sides thereof are angle bars 87 secured to the upper surface thereof in parallel relation, said angle bars 87, as shown in Fig. 15, having elongated slots 88 therein for the reception of pins 89 carried by the lower ends of cross levers 90, the upper ends of which are secured as at 91 to pan 46 so that, when in use, the pan 46 may be adjusted to various elevations with respect to base plate 83, as shown in dot and dash lines in Fig. 15; or, when desired to house the pan 46 to protect same from dirt and dust, the cross levers 90 may be adjusted to permit pan 46 to be lowered to such extent that same may pass through the opening in cabinet 81 so that the plate 83 and pan 46 may slide in a drawer-like fashion into the cabinet 81, as shown in dotted lines (Fig. 15).

As a further modification, in order to increase the range of vertical adjustment of pan 46, the cross arms 90 may be pivoted as at 90a (Fig. 17) and the lower ends of the links 90 carrying the pins 89 may slidably engage the slots 88 in the angle bars 87, while the upper ends of the arms 90, carrying pins 94 may slidably engage slots 95 in horizontal members 96 underlying the pan 46, so that as the toggle links formed by the cross arms 90 are extended, the pins 89 and 94 at the lower and upper ends thereof will move inwardly in their respective slots 88 and 95 until the same reach the inner ends of their related slots. The form shown in Fig. 17 is preferable to that shown in Fig. 15, since in Fig. 17 the pan 46 will always be maintained in a horizontal position, due to the fact that the toggle links 90 are pivoted as at 90a at their crossing points.

I do not limit my invention to the exact forms shown in the drawings for obviously changes may be made therein within the scope of the claims.

I claim:

1. A machine for driving expansible hones having a spindle carrying an adjustable collar, comprising a casing; a shaft journaled in said casing and adapted to support the hone spindle; a sleeve axially adjustably mounted on said shaft and engaging the hone adjusting collar and adapted to vary the external diameter of said hone; means for rotating the shaft; means for shifting the sleeve while the shaft is rotating, said sleeve having a head at its inner end; a lever pivoted at one end in said casing adjacent said head; trunnions on said head engaging the lever; and said shifting means comprising a calibrated hand wheel journaled on the casing, and a screw shaft operated by said hand wheel and having a threaded engagement with the free end of said lever.

2. A machine for driving expansible hones having a spindle carrying an adjustable collar, comprising a casing; a shaft journaled in said casing and adapted to support the hone spindle; a sleeve axially adjustably mounted on said shaft and engaging the hone adjusting collar and adapted to vary the external diameter of said hone; means for rotating the shaft; means for shifting the sleeve while the shaft is rotating said sleeve having a head at its inner end; a lever pivoted at one end in said casing and having an opening receiving said head; trunnions on said head within said opening and engaging said lever; and said shifting means comprising a calibrated hand wheel journaled on said casing, and a screw shaft operated by said hand wheel and having a threaded engagement with the free end of said lever.

3. A machine for driving expansible hones having a spindle carrying an adjusting collar, comprising a casing; a hollow shaft journaled in said casing and adapted to support the hone spindle; a sleeve axially adjustably mounted on said shaft and engaging the hone adjusting collar and adapted to vary the external diameter of said hone; means for rotating the shaft; means for shifting the sleeve while the shaft is rotating; said hone spindle being hollow and forming a continuation of said hollow shaft and having ducts opening into the interior of the hone adjacent the center thereof; and means for directing cutting fluid through said shaft and spindle.

4. In a machine as set forth in claim 3, said sleeve having a head at its inner end; a lever pivoted at one end in said casing adjacent said head; trunnions on said head engaging the lever; and said shifting means comprising a calibrated hand wheel journaled on the casing, and a screw shaft operated by said hand wheel and having a threaded engagement with the free end of said lever.

5. In a machine as set forth in claim 3, said sleeve having a head at its inner end; a lever pivoted at one end in said casing and having an opening receiving said head; trunnions on said head within said opening and engaging said lever; and said shifting means comprising a calibrated hand wheel journaled on said casing, and a screw shaft operated by said hand wheel and having a threaded engagement with the free end of said lever.

6. In a machine as set forth in claim 3, said directing means comprising a tank, a fluid pump driven by said shaft and receiving fluid from said tank; and a duct connecting the outlet of said pump with said shaft.

7. In a machine as set forth in claim 3, said directing means comprising a tank; a fluid pump driven by said shaft and receiving fluid from said tank; a duct connecting the outlet of said pump with said hollow shaft; a drip tank mounted below said hone collecting the overflow therefrom; and means for directing the overflow back into said tank.

8. A machine for driving expansible hones having a spindle carrying an adjustable collar, comprising a casing; a shaft journaled in said casing and adapted to support the hone spindle; a sleeve axially adjustably mounted on said shaft and engaging the hone adjusting collar and adapted to vary the external diameter of said hone; means for rotating the shaft; means for shifting the sleeve while the shaft is rotating; means on the casing for supporting the work being honed, said sleeve having a head at its inner end; a lever pivoted at one end in said casing adjacent said head; trunnions on said head engaging the lever; and said shifting means comprising a calibrated hand wheel journaled on the casing, and a screw shaft operated by said hand wheel and having a threaded engagement with the free end of said lever.

9. A machine for driving expansible hones having a spindle carrying an adjustable collar, comprising a casing; a shaft journaled in said casing and adapted to support the hone spindle; a sleeve axially adjustably mounted on said shaft and engaging the hone adjusting collar and adapted to vary the external diameter of said hone; means for rotating the shaft; means for shifting the sleeve while the shaft is rotating; means on the casing for supporting the work being honed, said sleeve having a head at its inner end; a lever pivoted at one end in said casing and having an opening receiving said head; trunnions on said head within said opening and engaging said lever; and said shifting means comprising a calibrated hand wheel journaled on said casing, and a screw shaft operated by said hand wheel and having a threaded engagement with the free end of said lever.

10. A machine for driving expansible hones having a spindle carrying an adjustable collar, comprising a casing; a shaft journaled in said casing and adapted to support the hone spindle; a sleeve axially adjustably mounted on said shaft and engaging the hone adjusting collar and adapted to vary the external diameter of said hone; means for rotating the shaft; means for shifting the sleeve while the shaft is rotating; means on the casing for supporting the work being honed, said supporting means comprising a track vertically and laterally adjustably mounted on said casing parallel with said shaft; and a work supporting trolley axially movably mounted on said track.

11. A machine for driving expansible hones having a spindle carrying an adjusting collar, comprising a casing; a hollow shaft journaled in said casing and adapted to support the hone spindle; a sleeve axially adjustably mounted on said shaft and engaging the hone adjusting collar and adapted to vary the external diameter of said hone; means for rotating the shaft; means for shifting the sleeve while the shaft is rotating; and said hone spindle being hollow and forming a continuation of said hollow shaft and having ducts opening into the interior of the hone adjacent the center thereof; a fluid tank; a fluid pump receiving fluid from said tank and directing the fluid into said hollow shaft; and a screen drip tank vertically adjustably mounted below said hone collecting the overflow therefrom; and means for directing the overflow back into said tank.

12. In a machine as set forth in claim 11, said sleeve having a head at its inner end; a lever pivoted at one end in said casing adjacent said head; trunnions on said head engaging the lever; and said shifting means comprising a calibrated hand wheel journaled on the casing, and a screw shaft operated by said hand wheel and having a threaded engagement with the free end of said lever.

13. In a machine as set forth in claim 11, said sleeve having a head at its inner end; a lever pivoted at one end in said casing and having an opening receiving said head; trunnions on said head within said opening and engaging said lever; and said shifting means comprising a calibrated handwheel journaled on said casing, and a screw shaft operated by said hand wheel and having a threaded engagement with the free end of said lever.

14. In a machine as set forth in claim 11, said casing being supported by a cabinet; a slidable drawer in said cabinet; and vertically adjustable means on said drawer supporting the drip pan, whereby when the drawer is pulled open the pan may be raised under the hone and whereby the pan may be lowered on said drawer and retracted with the drawer within the cabinet.

15. In a machine as set forth in claim 11, said casing being supported by a cabinet; a slidable drawer in said cabinet; cross links on said drawer vertically supporting the drip pan, whereby when the drawer is pulled open the pan may be raised under the hone and whereby the pan may be lowered on said drawer and retracted with said drawer within the cabinet.

16. In a machine as set forth in claim 11, said casing being supported by a cabinet; a slidable drawer in said cabinet; cross links on said drawer supporting the drip pan, said links being pivoted at their crossing points and slidably engaging guides on the drawer and on the pan to form toggle links; whereby when the drawer is pulled open the pan may be raised under the hone and whereby the pan may be lowered on said drawer and retracted with said drawer within the cabinet.

17. In a machine as set forth in claim 11, means on the casing for supporting the work being honed.

18. In a machine as set forth in claim 11, means on the casing for supporting the work being honed, said means comprising a track vertically and laterally adjustably mounted on the casing parallel with the shaft; and a work supporting trolley movably mounted on said track.

JOHN J. PALOTSEE.